United States Patent [19]

Knypl et al.

[11] 4,388,438
[45] Jun. 14, 1983

[54] AQUEOUS DISPERSIONS OF COPOLYMERS OF STYRENE DIBUTYL MALEATE AND ACRYLIC OR METHACRYLIC ACID OR MONOBUTYL MALEATE AND METHOD FOR PREPARATION THEREOF

[75] Inventors: Maria Knypl; Eugeniusz Knypl; Marian Starzak, all of Oświecim; Ewa Mieczkowska, Katowice; Urszula Pawlus, Siemianowice Slaskie; Romuald Pałubicki, Katowice; Mieczysław Ficek; Jozef Gołdynia, both of Oświecim, all of Poland

[73] Assignee: Osrodek Badaw Cze-Rozwojowy Kauczukow I Tworzyw Winylowych, Oświecim, Poland

[21] Appl. No.: 224,476

[22] Filed: Jan. 6, 1981

[30] Foreign Application Priority Data

Jan. 10, 1980 [PL] Poland ................................ 221298

[51] Int. Cl.$^3$ .............................................. C08L 35/06
[52] U.S. Cl. .................................... 524/833; 524/832; 524/559; 526/210
[58] Field of Search ................... 260/29.6 TA, 29.6 E, 260/29.6 ME; 526/210; 524/833

[56] References Cited

U.S. PATENT DOCUMENTS

| | | | |
|---|---|---|---|
| 2,962,465 | 11/1960 | Lindstrom et al. | 260/29.6 |
| 3,164,562 | 1/1965 | Breed | 260/29.6 |
| 3,472,681 | 10/1969 | Schuster et al. | 117/126 |
| 3,692,726 | 9/1972 | Oehmichen | 260/29.6 R |
| 3,736,286 | 5/1973 | Scott et al. | 260/29.6 RW |
| 3,736,287 | 5/1973 | Patella | 260/29.6 TA |
| 3,862,075 | 1/1975 | Sekmakas | 260/29.6 E |
| 4,059,665 | 11/1977 | Kelley | 264/128 |

FOREIGN PATENT DOCUMENTS 1484622  9/1977  United Kingdom .

OTHER PUBLICATIONS

"Bonotex BT 506, Acrylic Emulsion for Concrete Plaster and Asbestos Cement", Data Sheet BX 2110, AB Bofors, (Sweden).

*Primary Examiner*—Joseph L. Schofer
*Assistant Examiner*—Bernard Lipman
*Attorney, Agent, or Firm*—Michael N. Meller; Anthony H. Handal

[57] ABSTRACT

The method of preparing aqueous dispersions of copolymers of styrene dibutyl maleate and acrylic or methacrylic acid or monobutyl maleate consists in adding a monomer mixture comprising styrene in the amount of 40–90% by weight, dibutyl maleate in the amount of 10–60% by weight acrylic or methacrylic acid or monobutyl maleate in the amount of 1.0–10.0% by weight in relation to the sum of styrene monomer and dibutyl maleate into the emulsion water known constituents such as:

ionic emulsifier - non-ionic emulsifier, buffer, sodium acrylate, N-methylolmethacrylamide to which, prior to polymerization, an alkylene glycol comprising 2–6 carbon atoms in the alkylene group is added. The alkylene glycol is added in the amount of 1–6% by weight in relation to the sum of styrene monomer and dibutyl maleate while, the ratio of alkylene glycol to the methacrylic acid or monobutyl maleate contained in the monomer mixture is 1:0.2–2. The polymerization process is conducted at a temperature of 70°–90° C. up to complete reaction of the monomers, then the reaction mixture is cooled down to a temperature of 10°–30° C. and a single dose of concentrated ammonia water is added to adjust the pH of the composition to about 9.5. The obtained dispersions are used for thermal coating of building materials for protective and decorative purposes.

5 Claims, No Drawings

AQUEOUS DISPERSIONS OF COPOLYMERS OF STYRENE DIBUTYL MALEATE AND ACRYLIC OR METHACRYLIC ACID OR MONOBUTYL MALEATE AND METHOD FOR PREPARATION THEREOF

This invention relates to a method of preparing aqueous dispersions of copolymers of styrene, butyl esters of maleic acid and acrylic or methacrylic acid used directly for protective coating of structural elements by thermal methods or by mixing with a suitable pigment compound to achieve a decorative coating.

Aqueous dispersions of vinyl copolymers used for coating structural elements, preferably copolymers of styrene, butadiene, vinyl acetate, methacrylic and maleic esters and their mutual combinations containing insignificant amounts of an ethylenically-unsaturated monomer which includes a functional group e.g. carboxyl, amide, methylamide, epoxide, hydroxyl etc. are characterized by their precisely determined physicochemical properties that determine their uses.

From the viewpoint of application, amongst the most desired properties of a dispersion are the following: good penetration into a porous substrate, resistance to low temperature and to the action of electrolytes, low degree of foaming, short drying time and easy application by various techniques. The coating obtained after drying the dispersion should feature a good adherence to the substrate and should be resistant to the action of the alkaline substrate, to weather, industrial gases and ageing. An essential feature is also a high external hardness of coating that ensures non-adherence of the sheets during storage and shipment as well as low water absorbability and resistance to the action of water.

In addition, the polymer coating formed should prevent blooming.

The aforesaid requirements demanded from copolymers and coatings obtained from them depend on the physico-chemical properties of the dispersion such as: viscosity, size of the copolymer particles, minimum temperature of film formation (MTFF), mean glass transition temperature of the polymer (Tg), stability of the freeze-thaw cycle which depend on the chemical composition of the copolymer as well as on the use of suitable auxiliary agents. Very desirable is the satisfaction of the condition Tg MTFF$\geq$5 and this can be achieved in the known methods by the introduction in the prepared dispersion of such compounds as alkylene glycols. The addition of these compounds to the prepared dispersion facilitates film formation and reduces the MTFF of the polymer but extends the coating drying time, increases the coating water absorbability and causes matting.

The methods of preparing aqueous dispersions of vinyl copolymers known from the literature and destined for use in the building industry involve emulsion polymerization of appropriate monomers in a water solution containing ionic or non-ionic emulsifiers, protective colloids, polymerization initiators and buffering agents.

Qualitative and quantitative composition of the emulsion water is selected depending on the type of dispersion used.

The widely used ionic emulsifiers are alkylarylsulfonates. The preferred non-ionic emulsifiers are the products of the condensation of alkylene oxides with higher fatty acids. Usually hydroxyethylcellulose of different degrees of substitution or polyvinyl alcohol perform the function of a protective colloid. Protective colloids which perform various functions are introduced in the process of polymerization as constituents of the emulsion water, and also to the already prepared dispersion. To the already prepared dispersion the following auxiliary agents are introduced: alkylene glycols and polyglycols to reduce the MTFF and to perform the functions of antifreeze additives, melamine resins, formalin, oxides, hydroxides and salts of organic acids of the following cations: Hg, Ca, Zn, Ba, Al, Ti, Pb, Cr, Co, Ni being the cross-linking agents, sodium polyacrylate as viscosity regulator, phenol derivatives as bacterial and fungicidal agents as well as silicone anti-foam agents and others. The described methods of preparing a dispersion, types of copolymers and the above-mentioned auxiliary agents added the obtained dispersion prior to their use are described in British Pat. No. 1,484,622, in U.S. Pat. Nos. 3,736,286, 3,736,287; 3,472,681 as well as in e.g. pamphlet AB Bofors (Sweden) Data Sheet BX2110 "Bonotex BT506".

The essence of the process, according to the invention, is the introduction into the previously prepared emulsion prior to polymerization of alkylene glycols containing from 2 to 6 carbon atoms in the alkylene group in the amount of 1–6% by weight in relation to the sum of the styrene and maleic esters, the ratio of alkylene glycol, or preferably ethylene glycol to the methacrylic acid or monobutyl maleate in the monomer mixture is 1:0.2–2.

According to the invention the method constists in introducing continuously a monomer mixture comprising styrene in the amount of 40–90% by weight, preferably 70–80% by weight, dibutyl maleate in the amount of 10–60% by weight, preferably 20–30% by weight, acrylic or methacrylic acid or monobutyl maleate in the amount of 1.0–10.0% by weight in relation to the sum of monomers of styrene and dibutyl maleate into the peviously prepared emulsion water. Emulsion water is prepared by adding to demineralized water the following constituents in the sequence stated below, 2–8% by weight of an emulsifier mixture that consists of sodium alkylarylsulfonates and alkylpolyoxyethylene ethers obtained through polyaddition of ethylene oxide to unsaturated fatty alcohols e.g. Rekanol or Slowasol, the ratio of ionic emulsifier to non-ionic emulsifier being 1:2–10, 0.2–1.0% by weight of a buffer-sodium acetate, 0.1–1.0% by weight of sodium acrylate, 0.3–3.0by weight of an ethylenically-unsaturated monomer containing an N-methylol group e.g. N-methylolmethacrylamide introduced in the form of a 50% aqueous solution, 1–6% by weight of alkylene glycol.

Weight percentages of the constituents of the emulsion water are given in relation to the sum of monomers of styrene and dibutyl maleate. The emulsion water is heated up to 70° C. and then a small amount of polymerization initiator is introduced followed by the monomer mixture.

The polymerization process is conducted at 70°–90° C. until a complete interreaction of the monomers is achieved; next only one dose of concentrated ammonia water is introduced into the composition cooled down to 10°–30° C. to obtain a pH of the composition of about 9,5. The described method of producing the dispersion of the aforesaid vinyl copolymers permits obtaining a dispersion containing free N-methylol, carboxyl and hydroxyl groups capable of cross-linking during the coating drying phase. Because of this it is not necessary to introduce cross-linking agents into the prepared dispersion. The introduction of an alkylene glycol, preferably of ethylene glycol into the emulsion water prior to the polymerization process permits obtaining a number of advantageous properties of the dispersion and coatings obtained therefrom. The alkylene glycol in the emulsion water performs the function of an apparent plasticizer reducing the MTFF to the value of about 42 ±2° C. with the value Tg 50 ±2° C. maintained and thus not causing a simultaneous extension of drying time and reduction in waterproofness. As has already been stated in the prior art the phenomenon of reduced waterproofness occurs when the alkylene glycol is introduced into the already prepared polymer dispersion.

The dispersion obtained in this manner, according to the invention, has a value for the difference Tg-MTFF equal to 8 (with the condition Tg-MTFF≧5 satisfied) and this, on one hand, enables the formation of a uniform film already at a temperature above 40° C. and, on the other, ensures a complete mutual non-adherence of asbestos-cement sheets when cooled to a temperature below 50° C.

Another feature of the dispersion obtained by the introduction of alkylene glycol into the emulsion water is the resistance of the dispersion to freezing, as a result of the synergistic action of the alkylene glycol with the acrylic or methacrylic acid or butyl monomaleate contained in the monomer mixture. The dispersion obtained by the method described in the invention has been tested on the stability of the cycle: solidification-melting (at a temperature of −15° C.) according to the standard of the International Standard Organization (ISO) No. 1147-1975. This dispersion exhibits stability of physicochemical properties even after 10 cycles (the standard provides for tests in 5 cycles).

Consequently, it is not required to introduce antifreezing agents into the prepared dispersion or the paint obtained thereof as is the case in the hitherto known methods. This enables the storage, shipment and use of the dispersion in cold seasons of the year.

The alkylene glycol present in the emulsion water in combination with the emulsifier mixture ensures a proper surface tension which prevents the dispersion and paint formed of the latter from foaming shipment and use; therefore it is not necessary to add antifoaming agents into the prepared dispersion which is generally necessary in the methods known so far.

Also the so-called viscosity promotors are not introduced into the dispersion. This function is performed by sodium polyacrylate which is produced in the polymerization process from the sodium acrylate emulsion contained in the emulsion water.

Apart from the mentioned advantageous features the dispersion has a high pH of about 9.5 which prevents the occurrence of cross-linking during the storage period. The cross-linking process occurs no earlier than during the coating drying since the ammonia promoting the alkalinity evaporates at that temperature. If the coating produced from the dispersions obtained is to play merely a protective role it should be applied by the known methods directly onto the surface of the asbestos-cement products or the dispersion should be previously mixed with a suitable pigment paste and then such a coating also fulfills the decorative functions.

The dispersion obtained according to the invention, having been applied on the asbestos-cement products, forms a uniform and shining coating having a high resistance to the action of an alkaline substrate and high adherence to the substrate.

The method of producing aqueous dispersions of copolymers of styrene, butyl esters of maleic acid and acrylic or methacrylic acid is presented in detail in the following examples.

EXAMPLE 1.

With continuous mixing there are introduced into a flask provided with an agitator: 200 ml of demineralized water, 1 g sodium dodecyl benzene sulfonate, 5.83 g Rokanol or Slowasol, 0.7 g sodium acetate, 0.7 sodium acrylate, 2.8 g 50% aqueous solution of N-methylolmethacrylamide and 5.6 g ethylene glycol, in the stated order. The obtained emulsion water is mixed and simultaneously heated up to a temperature of 70° C. At this temperature there is introduced only once 0.56 g of potassium persulfate dissolved in 20 ml emulsion water and instantly dosing of the monomer mixture having the following composition: 105 g styrene, 35 g dibutyl maleate and 4.2 g acrylic acid is begun. The dosage of the monomer mixture should last for about 4 hours. Then the temperature of the reaction mixture is increased to 90° C. and maintained at this level for 1.5 hours whereupon it is cooled down to a temperature of 25° C. and treated with one dose of 3.3 g of concentrated ammonia water.

EXAMPLE 2

A monomer mixture is added to the emulsion water prepared as per Example 1. The monomer mixture has the following composition: 112 g styrene, 28 g dibutyl maleate, 8,4 g monobutyl maleate. Further steps as per Example 1 with one difference that the polymerization is conducted at a temperature of 75° C.

EXAMPLE 3

To the emulsion water containing 0.7 g dodecyl benzene sulfonate, 3.5 g Rokanol or Slowasol and other constituents as per Example 1 is added a monomer mixture having the composition as per Example 1. Further procedure as per Example 1.

EXAMPLE 4

To the emulsion water prepared as per Example 1 with the only difference that 7.42 g ethylene glycol are introduced, is added a monomer mixture containing 98 g styrene, 42 g dibutyl maleate, 11.2 g acrylic acid. Further procedure as per Example 1.

EXAMPLE 5

To the water emulsion prepared as per Example 1 with the only difference that 2.1 g ethylene glycol are introduced, is added a monomer mixture containing: 109.2 g styrene, 30.8 g dibutyl maleate, 4.2 g acrylic acid. Further procedure as per Example 1, but polymerization is conducted at a temperature of 90° C.

EXAMPLE 6

The test is carried out as per Example 1 with the only difference that a monomer mixture having the following composition; 105 g styrene, 35 g dibutyl maleate and 4.2 g methacrylic acid, is added to the emulsion water.

EXAMPLE 7

The test is carried out as per Example 1 with the only difference that in place of ethylene glycol 5.6 g propylene glycol is added to the emulsion water.

Example 8

The test is carried out as per Example 1 with the only difference that instead of ethylene glycol 5.6 hexylene glycol are introduced into the emulsion water.

The aqueous dispersions of copolymers (white-blue liquids) obtained according to examples 1-8 are characterized by the following physico-chemical properties:

| dry substance content | 42 ± 2% by weight |
|---|---|
| viscosity (measured by Ford cup tester No. 4) | 15 ± 3 sec. |
| pH | about 9.5 |
| size of particles | 500-600 A /50-60 nm/ |
| surface tension | 42 ± 0.5 dynes/cm$^2$ |

The dispersions obtained were applied by spraying onto asbestos-cement slabs heated to a temperature of about 75° C. and then dried in 1 minute; after that the slab was cooled down to a temperature of 40° C. and subjected to testing. The coating thickness amounts to 35 μm. The dispersion applied onto slabs and obtained by the wet method (Hatschek method) as well as by the dry method (treatment in autoclaves). The results of the tests on the properties of the dispersions obtained according to Examples 1-8 and coatings formed thereof are shown in Tables 1-3. For the sake of comparison four tests were made of obtaining the dispersion without adding ethylene glycol to the emulsion water.

EXAMPLE 9

The test is performed as per Example 1 with the only difference that ethylene glycol is neither introduced into the emulsion water nor into the prepared dispersion.

EXAMPLE 10

The test is performed as per Example 1 with the only difference that ethylene glycol in the amount of 5.6 g is introduced into the prepared dispersion.

EXAMPLE 11

The test is performed as per Example 10, but with the amount of ethylene glycol being increased to 11.2 g. The copolymer dispersions (white-blue liquid) obtained according to Examples 9-11 exhibit the following physico-chemical properties:

| dry substance content | 42 ± 2% by weight |
|---|---|
| viscosity (measured by Ford cup tester No. 4) | 20 ± 3 sec |
| pH | about 9.5 |
| size of particles | 900-1200 A /90-120 nm/ |
| surface tension | 30 ± 3 dynes/cm$^2$ |

The results of the tests on the properties of dispersions obtained according to Examples 9-11 and coatings formed thereof are also shown in Tables 1-3.

TABLE 1

The results of the tests on dispersions obtained according to Examples 1-8 and comparable, dispersions obtained in Examples 9-11.

| Example | MTTF Minimum temperature of film formation °C. | Tq Mean glass transition temperature °C. | Tg - MTTF Mean glass transition temperature - Minimum temperature of film formation °C. | Stability of solidification - melting cycle Number of cycles |
|---|---|---|---|---|
| 1 | 40 | 47 | 7 | over 10 without changes |
| 2 | 41 | 51 | 10 | over 10 without changes |
| 3 | 43 | 52 | 9 | over 10 without changes |
| 4 | 38 | 47 | 9 | over 10 without changes |
| 5 | 43 | 53 | 10 | over 10 without changes |
| 6 | 40 | 47 | 7 | over 10 without changes |
| 7 | 41 | 50 | 9 | over 10 without changes |
| 8 | 38 | 47 | 9 | over 10 without changes |
| 9 | 51 | 45 | −6 | coagulation after 1 cycle |
| 10 | 48 | 45 | −3 | coagulation after 1 cycle |
| 11 | 44 | 46 | 2 | coagulation after 1 cycle |

TABLE 2

The results of tests on the coatings obtained from dispersions according to Examples 1-8 as well as on coatings from comparable dispersions obtained according to Examples 9-11 (films formed on glass).

| Example | Appearance of film formed on glass | Hardness relative to glass coating thickness 40 μm | Water absorption % by weight, coating thickness 1 mm after 10 days of keeping in water | Water absorption % by weight, coating thickness 1 mm after 20 days of keeping in water | Appearance of coating after 20 days of keeping in water |
|---|---|---|---|---|---|
| 1 | glossy transparent | 0.40 | 11.8 | 12.8 | unchanged |
| 2 | glossy transparent | 0.41 | 11.9 | 13.0 | " |
| 3 | glossy transparent | 0.41 | 11.9 | 13.0 | " |
| 4 | glossy transparent | 0.40 | 12.8 | 13.9 | " |
| 5 | glossy transparent | 0.42 | 10.7 | 11.8 | " |
| 6 | glossy transparent | 0.40 | 11.8 | 12.8 | " |
| 7 | glossy transparent | 0.41 | 11.4 | 12.0 | " |
| 8 | glossy transparent | 0.40 | 13.0 | 14.1 | " |
| 9 | glossy transparent | 0.37 | 12.1 | 13.5 | " |
| 10 | mat | 0.37 | 15.6 | 19.1 | whitish comes off the substrate |

TABLE 2-continued

The results of tests on the coatings obtained from dispersions according to Examples 1-8 as well as on coatings from comparable dispersions obtained according to Examples 9-11 (films formed on glass).

| Example | Appearance of film formed on glass | Hardness relative to glass coating thickness 40 μm | Water absorption % by weight, coating thickness 1 mm after 10 days of keeping in water | after 20 days of keeping in water | Appearance of coating after 20 days of keeping in water |
|---|---|---|---|---|---|
| 11 | mat | 0.37 | 19.8 | 28.4 | whitish comes off the substrate |

The tests on dispersions and coatings made thereof are carried out by the following methods:

(a) Stability of solidification-melting cycle is determined according to the standard of International Standard Organization (ISO) No. 1147-1975

(b) Tg determined by using differential calorimeter type DSC-1D, of Perkin-Elmer firm (c) Adherence of resin to the asbestos-cement sheet determined according to Polish Standard PN-73/C-81531. Measurements made by means of circular tool, graduation 1 mm. Adherence marked in degrees.

1—very good
2—good
3—weak (d) Resistance to lime blooming (blooms)

The results of the tests on asbestos-cement sheets covered with polymer coating from dispersions obtained according to Example 1-8 and from dispersions obtained from Examples 9-11

| Example | DRYING TIME OF COATED min | ADHERENCE TO substrate | PRESENCE OF BLOOMING | RESISTANCE TO MUTUAL ADHERENCE OF SHEETS AT 40° C. | ICE TEST | TEST OF BOILING IN WATER FOR 4 HOURS |
|---|---|---|---|---|---|---|
| 1 | 1 at 75° C. | 1 | 0 | none | No blisters, exfoliations and spalls after 5 cycles | no change, blisters and spalls |
| 2 | 1 at 75° C. | 1 | 0 | none | No blisters, exfoliations and spalls after 5 cycles | no changes, blisters and spalls |
| 3 | 1 at 75° C. | 1 | 0 | none | No blisters, exfoliations and spalls after 5 cycles | no changes, blisters and spalls |
| 4 | 1 at 75° C. | 1 | 0 | none | No blisters, exfoliations and spalls after 5 cycles | no changes, blisters and spalls |
| 5 | 1 at 75° C. | 2 | 0 | none | No blisters, exfoliations and spalls after 5 cycles | no changes, blisters and spalls |
| 6 | 1 at 75° C. | 1 | 0 | none | No blisters, exfoliations and spalls after 5 cycles | no changes, blisters and spalls |
| 7 | 1 at 75° C. | 1 | 0 | none | No blisters, exfoliations and spalls after 5 cycles | no changes, blisters and spalls |
| 8 | 1.5 at 75° C. | 1 | 0 | none | No blisters, exfoliations and spalls after 5 cycles | no changes, blisters and spalls |
| 9 | 3 at 90° C. | 2 | 1 | spot adhesion | exfoliations and blisters over the whole surface after 1 cycle | local blisters |
| 10 | 5 at 90° C. | 2 | 2 | spot adhesion | exfoliations and blisters over the whole surface after 2 cycles | local blisters, exfoliations and spalls |
| 11 | 12 at 90° C. | 3 | 3 | spot adhesion | exfoliations and blisters over the whole surface after 5 cycles | blisters, exfoliations and spalls over the whole surface |

While comparing the results of the tests on dispersions obtained according to Examples 1-11 and coatings made thereof both on glass and asbestos-cement sheets presented in Tables 1-3 it can be said that dispersions formed according to the method described in the invention/Examples 1-8/ and coatings made thereof are characterized by considerably better properties from the viewpoint of their use, than dispersions obtained according to Examples 9-11.

On asbestos-cement sheets covered with polymer coatings and obtained both by wet and dry methods there is fitted a rubber ring having an inside diameter of 150 mm, height of 10 mm and protected with plasticine or wax from the external side. The ring-limited surface of the asbestos-cement sheet is treated with 50 cm³ of distilled water.

After evaporation of the water the surface was examined for white lime specks. The condition was defined as follows:

0—no blooms
1—small blooms
2—distinct blooms
3—intensive blooms (e) Resistance of sheets to adhesion The surface of 60×60 asbestos-cement sheets heated to a temperature of 90° C. was covered with the tested polymer dispersion by means of spraying and then was dried for 1 minute at a temperature of 75° C.

The coatings obtained were 35 μm thick. Immediately after drying and cooling down to a temperature of 40° C. the coated sheets were placed one on top of the other "face to face" being loaded with a weight of 115 g/cm$^2$ and left at a temperature of 40° C. for 3 hours. Then the load was removed and the plates checked for adhesion.

The coated surfaces showed no inclination to adhesion.

(f) Boiling test

Asbestos-cement sheets coated as has been described above were boiled for 4 hours in water whereupon the state of the coating was checked for blisters, exfoliations and spalls.

(g) Ice test

Asbestos-cement sheets coated as has been described above were placed in a container of water and frozen for 24 hours at a temperature of −25° C. Next, they were defrosted at room temperature for 4–5 hours and their surface was checked for blisters, exfoliations and spalls. Tests have been carried out for 5 cycles for each tested asbestos-cement sheet and after each cycle the state of the coatings was examined.

We claim:

1. A method for preparing an aqueous dispersion of a copolymer of styrene, dibutyl maleate and acrylic or methacrylic acid or monobutyl maleate, said method consisting in emulsion polymerization of a mixture of monomers containing styrene in the amount of 40–90 percent by weight, dibutyl maleate in the amount of 10–60 percent by weight, and acrylic or methacrylic acid or monobutyl maleate in the amount of 1.0–10.0 percent by weight in relation to the sum total of monomers, said monomer mixture being added to a water phase previously prepared by adding a free radical polymerization initiator in one dose in the amount of 0.3 percent by weight to water containing a mixture of ionic and non-ionic emulsifiers in a ratio of 1:3–10 and in the amount of 2–8 percent by weight; a buffer in the amount of 0.2–1.0 percent by weight; the sodium salt of an α,β-ethylenically unsaturated carboxylic acid in the amount of 0.1–1.0 percent by weight; a water souble ethylenically unsaturated monomer containing an N-methylol group in the amount of 0.3–3.0 percent by weight and an alkylene glycol containing 2–6 carbon atoms in the alkylene radical in the amount of 1–6 percent by weight relative to the sum total of monomers, the ratio of alkylene glycol to the amount of acrylic or methacrylic acid or monobutyl maleate contained in the monomer mixture being 1:0.2–2.0; said polymerization being conducted at a temperature from 70°–90° C. until the monomer reaction has been completed and then cooling the reaction mixture to a temperature of 10°–30° C. and neutralizing the mixture to a pH value of 9.5 by the addition of a concentrated water solution of ammonia.

2. The method as claimed in claim 1, wherein said alkylene glycol is ethylene glycol.

3. The method as claimed in claim 1, wherein said sodium salt of an α,β-ethylenically unsaturated carboxylic acid is sodium acrylate.

4. The method as claimed in claim 1, wherein said unsaturated monomer containing an N-methylol group is N-methylolmethacrylamide.

5. Dispersions prepared according to the method as claimed in claim 1.

* * * * *